United States Patent [19]
Kano et al.

[11] Patent Number: 5,422,449
[45] Date of Patent: Jun. 6, 1995

[54] WIPER DRIVING APPARATUS

[75] Inventors: Masami Kano; Yoshimasa Kimura, both of Kiryu, Japan

[73] Assignee: Mitsuba Electric Manufacturing Co., Ltd., Gunma, Japan

[21] Appl. No.: 60,279

[22] Filed: May 11, 1993

[30] Foreign Application Priority Data

May 11, 1992 [JP]  Japan .................. 4-038001 U

[51] Int. Cl.6 .......................................... H01H 19/00
[52] U.S. Cl. ........................ 200/19 R; 200/24
[58] Field of Search ............... 200/4, 5 R, 19 R, 21, 200/23, 24, 27 R, 28, 38 R, 61.54

[56] References Cited

U.S. PATENT DOCUMENTS

| | | | |
|---|---|---|---|
| 3,693,119 | 9/1972 | Nakama et al. | 335/59 |
| 4,613,733 | 9/1986 | Migrin et al. | 200/5 R |
| 4,700,026 | 10/1987 | Kamiyama et al. | 200/19 R |
| 5,068,500 | 11/1991 | Kitada | 200/19 R |

FOREIGN PATENT DOCUMENTS

| | | | |
|---|---|---|---|
| 0359227 | 3/1990 | European Pat. Off. | B60S 1/08 |
| 61-21657 | 2/1986 | Japan | B60S 1/08 |
| 61-191960 | 11/1986 | Japan | B60S 1/08 |
| 62-176068 | 11/1987 | Japan | B60S 1/08 |
| 241857 | 3/1990 | Japan | B60S 1/08 |
| 1543137 | 3/1979 | United Kingdom | H02K 7/00 |
| 2175493 | 12/1986 | United Kingdom | B60S 1/08 |

*Primary Examiner*—A. D. Pellinen
*Assistant Examiner*—Michael A. Friedhofer

[57] ABSTRACT

A wiper driving apparatus comprising: a drive gear rotated by a motor; a clutch member rotating together with the drive gear only in a direction the drive gear is biased to; a pair of electric conductor plates for turning on and off an electric circuit of the motor; a pair of movable contacts rotatable relatively with the electric conductor plates in sliding contact with the electric conductor plates, respectively; and a housing rotatably supporting the clutch member with a supporting axle and having the electric conductor plates provided concentrically therewith; wherein both of the movable contacts and the clutch member are rotated integrally with one another. The clutch member is formed as a conductive member, one of the movable contacts is formed integrally on the clutch member, and the electric conductor plate, on which the movable contact slides, is disposed adjacently to the supporting axle.

7 Claims, 5 Drawing Sheets

WIPER DRIVING APPARATUS

BACKGROUND OF THE INVENTION

1. Field of the Invention

This invention relates to a wiper driving apparatus, and more particularly to improvements in a device for stopping a wiper at a predetermined position, effectively utilized, for example, in a wiper driving apparatus mounted on vehicles such as automobiles which may run in an area of snowfall.

2. Related Art Statement

In general, in a wiper driving apparatus mounted on a vehicle such as an automobile, in order to secure the safety driving, there is provided a device for stopping a wiper at a predetermined position, by which a wiper blade is moved to a bottom corner of a window and stopped thereat, even when a switch at hand is turned off at random.

A conventional device of this type for stopping a wiper at a predetermined position is constructed such that an electric conductor plate including a non-conductive portion in part has been attached to an end face of a drive gear, and a contact is provided in a housing, so as to slide on the electric conductor plate in accordance with rotation of the drive gear, the contact and the electric conductor plate constituting a switch for turning on and off an electric circuit for a motor.

When the switch at hand is turned off at random, an electric circuit for driving a wiper blade to the predetermined position is formed passing through the electric conductor plate and the contact. Thereafter, when the wiper blade arrives at the predetermined position, a main circuit is cut off at the non-conductive portion. At the same time, an armature circuit is short-circuited, whereby electric breaking is applied. With these operations, a wiper motor is automatically stopped at the predetermined position.

However, in the wiper driving apparatus having the above-described device for stopping the wiper blade at a predetermined position, when an external force is applied in a direction opposite to the normal rotation of the drive gear, for example, in the case where snow is scraped together to the bottom of the window, the chattering phenomenon, in which conduction and non-conduction are repeated between the electric conductor plate and the contact, occurs. When the chattering occurs, the wiper driving apparatus is heated to a considerably high temperature, and is thereby damaged in quality and durability. This is a problem inherent in the conventional wiper driving apparatus.

In this circumstances, there has been developed following wiper driving apparatuses which can prevent the chattering phenomenon. (Refer to Japanese Utility Model Laid-Open Nos. 61-21657, 61-191960 which corresponds to U.S. Pat. No. 4,700,026, 62-176068 and 2-41857 which corresponds to U.S. Pat. No. 5,068,500).

That is, in these wiper driving apparatuses, a clutch member is rotatably provided for rotating together with a drive gear in a direction that the drive gear is biased to. A switch mechanism for turning on and off the electric circuit of the motor, which consists of electric conductor plates and the contacts, is interposed between the clutch member and a housing.

During normal operation, the electric conductor plates and the contacts are rotated relatively with each other by the clutch member along with the rotation of the drive gear. When an external force to rotate the drive gear reversely is applied to the drive gear, the electric conductor plates and the contacts are not caused to follow the reverse rotation of the drive gear due to the clutch member, so that the relative backward movement between the electric conductor plates and the contacts can be prevented.

However, these wiper driving apparatuses cannot be rendered compact in size satisfactorily.

For example, in the conventional apparatus, an insulator is used in the clutch member and the clutch member is rotatably provided on a supporting axle of the housing, so that the housing must be formed to increase its height.

Furthermore, the electric conductor plates are disposed coaxially around a clutch plate, so that the housing must be increased in diameter and in height in order to constitute therein the switch turning on and off the electric circuit of the motor.

SUMMARY OF THE INVENTION

An object of the present invention is to provide a wiper driving apparatus which can facilitate downsizing of the apparatus.

According to the present invention, a wiper driving apparatus comprising: a drive gear rotated by a motor to drive a wiper; a clutch member engageable with said drive gear; a pair of electric conductor plates constituting a switch for turning on and off an electric circuit of said motor; a pair of movable contacts relatively rotatable with said electric conductor plates in sliding contact with said electric conductor plates respectively, said movable contacts being arranged on said clutch member for rotation together with said clutch member; and a housing formed of insulating materials, said housing rotatably supporting said clutch member with an axle, and having said electric conductor plates provided concentrically about said axle, is characterized in that:

one of said electric conductor plates which is provided on the inner peripheral side is formed in circular shape and provided adjacently to and around the axle;

said clutch member is formed as a conductive member; and one of said movable contacts is formed integrally on said clutch member and said movable contact is sliding contact with said electric conductor plate on the inner peripheral side.

According to the above-described means, the clutch member is formed as the conductive member not as the insulator, and therefore, the clutch member is formed integrally with the movable contact. Further, the electric conductor plate on the inner peripheral side is provided around the axle of the housing and is in sliding contact with the clutch member. Therefore, it is not necessary to electrically separate the clutch member from the electric conductor plate on the inner peripheral side, so that the respective electric conductor plates can be reduced in diameter. Furthermore, as compared with the apparatus wherein the insulator is used in the clutch member, the housing can be made decreasing in its thickness by the decrease in the thickness of the clutch member. Accordingly, it is possible to downsize the housing containing therein the switch mechanism for turning on and off the electric circuit of the motor.

DETAILED DESCRIPTION OF THE PREFERRED EMBODIMENTS

Figure 1:
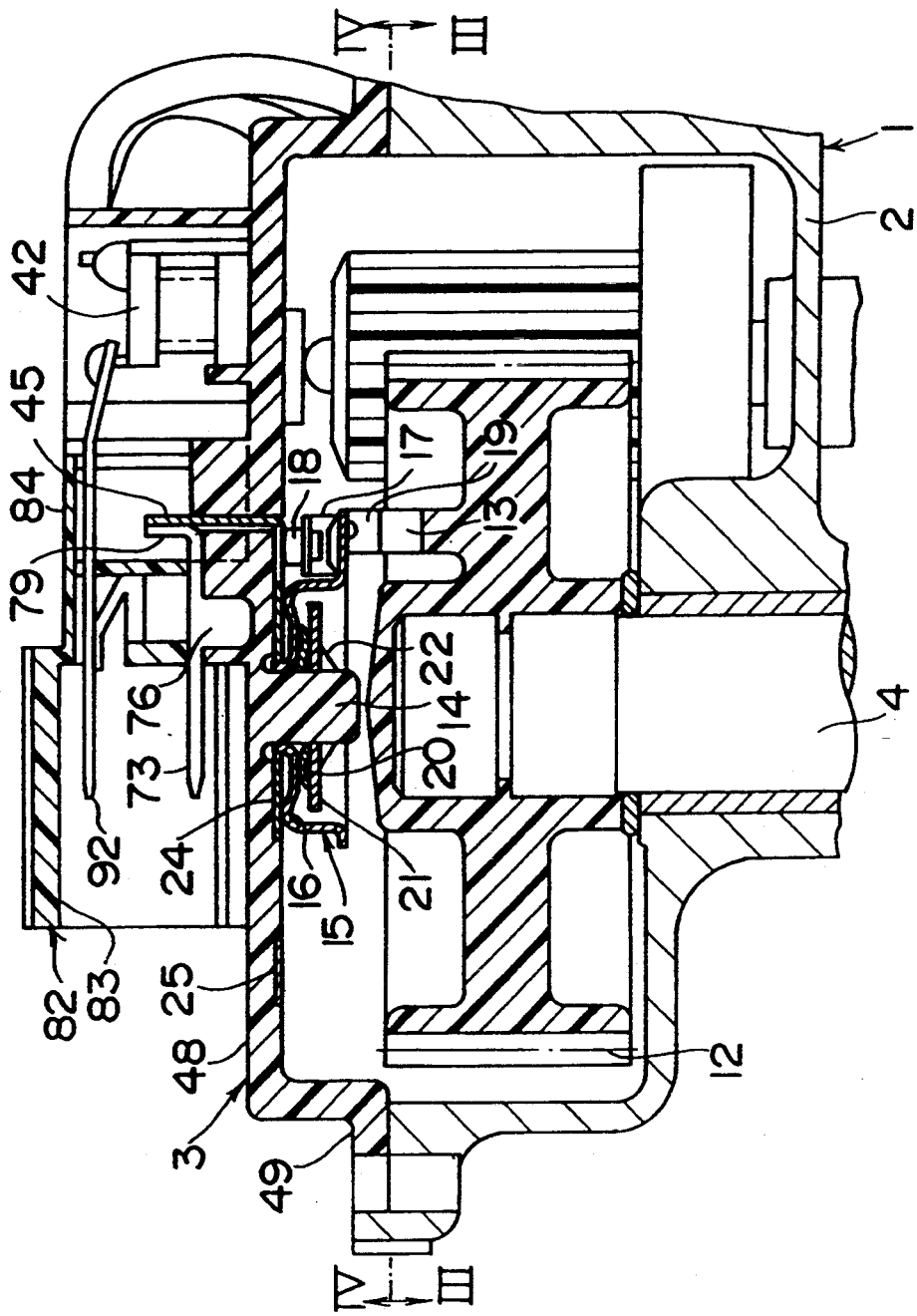
FIG. 1 is a longitudinal sectional view showing the essential portions of an embodiment of the wiper driving apparatus according to the present invention.

In the embodiment shown in the drawings, this wiper driving apparatus comprises a housing 1. The housing 1 has a lid member 3 for covering an opening of a main body 2 which forms a gear box, whereby the housing 1 forms therein a tightly closed chamber.

Figure 5:
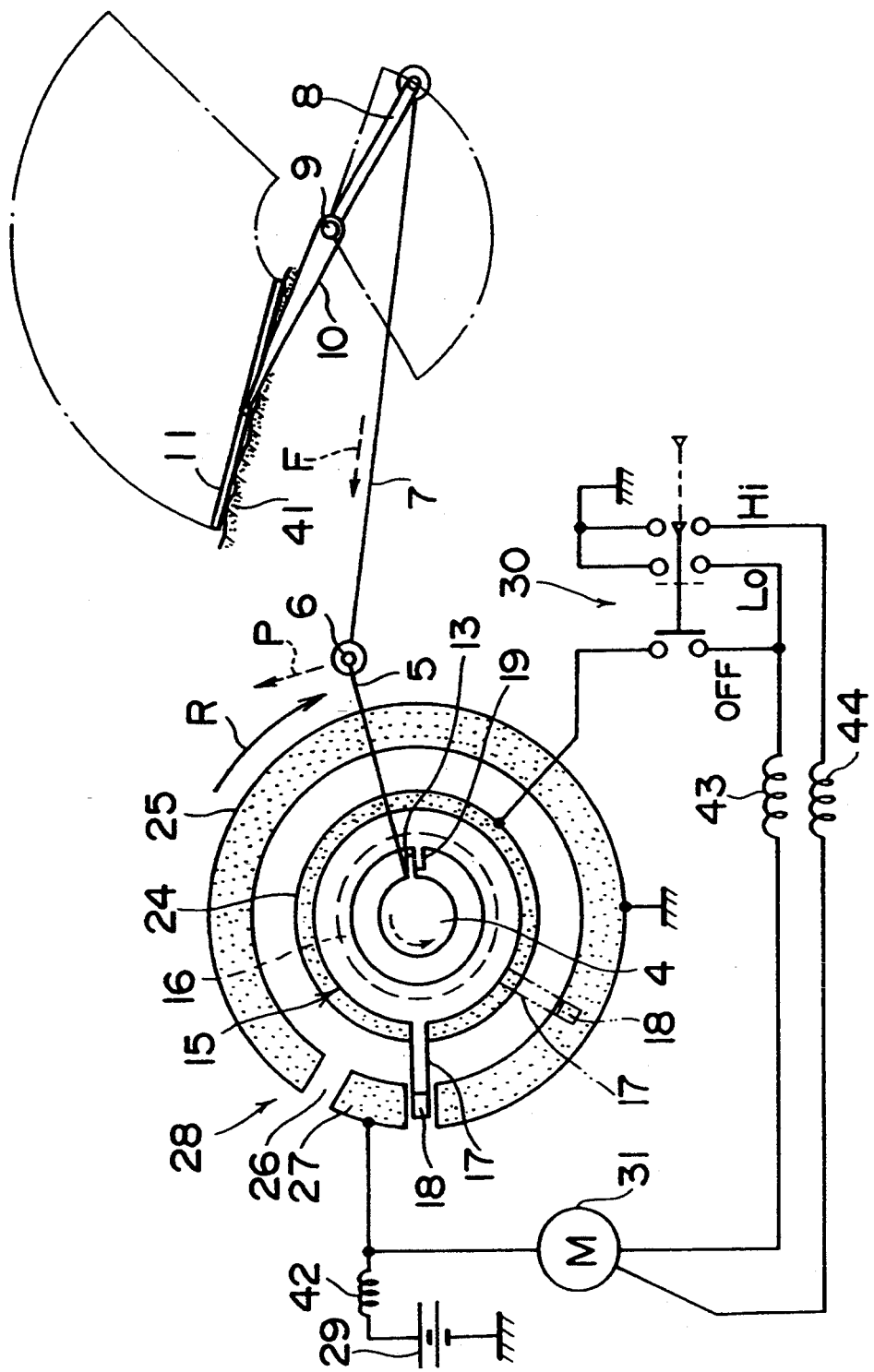
FIG. 5 is a typified view for explaining the action.

A driveshaft 4 is rotatably supported at the substantially central portion of the main body 2. As shown in FIG. 5, a link 5 is integrally rotated with the driveshaft 4, and an end of a rod 7 is rotatably connected to a free end of the link 5 through a ball joint 6. The other end of the rod 7 is rotatably connected to a free end of a linkage 8.

The other end of the linkage 8 is fastened to a shaft 9 which is rotatably supported at a lower position in a window frame of an automobile. A wiper arm 10 holding a wiper blade 11 at a free end thereof is supported on the shaft 9 in a manner to be rotatable integrally therewith.

A drive gear 12, as shown in FIG. 1, is integrally formed of rigid synthetic resin and coupled to an end portion of the driveshaft 4 in the chamber of the housing 1 in a manner to be rotated integrally with the driveshaft 4. An driving engageable portion 13 is projected from an end face on the side of the lid member 3 (hereinafter referred to as the "upper side") of the drive gear 12.

Figure 2:
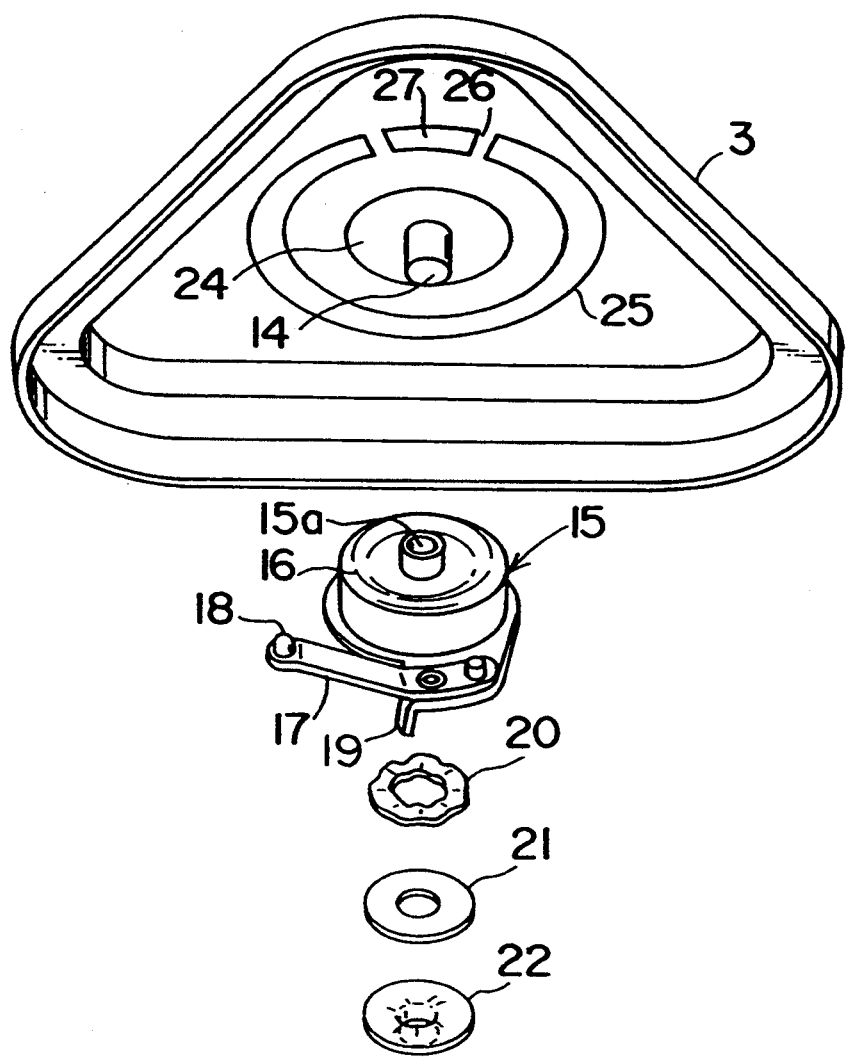
FIG. 2 is a disassembled perspective view thereof.

As shown in FIGS. 1 and 2, the lid member 3 is made of an insulating material such as rigid synthetic resin, and integrally formed in a generally triangular dish shape. A supporting axle 14 is integrally formed with a ceiling surface of the lid member 3. The supporting axle 14 is projected vertically downwardly in a manner to be aligned in shaft axis with the driveshaft 4.

A central shaft hole 15a of a clutch member 15 is coupled to the supporting axle 14 to mount the clutch member 15 to the axle 14. Further, a wave washer 20, a flat washer 21 and a stopper ring 22 are coupled successively to the supporting axle 14, whereby the clutch member 15 is positioned between the undersurface of the lid member 3 around the supporting axle 14 and the washers 20, 21. Then, in this state, the clutch member 15 is rotatably supported on the supporting axle 14.

The clutch member 15 is made of a conductive material such as copper. The clutch member 15 is integrally formed so as to include a major portion having a short cylindrical shape, in which one end of the cylinder is closed by an end wall containing the control shaft hole 15a. First movable contact 16 is formed so as to bulge outwardly in the axial direction of the clutch member 15 around the outer periphery portion of the closed wall of the clutch member 15. The first movable contact 16 has an annular shape concentric with the control shaft hole 15a, as seen in FIG. 2, and, as seen in FIG. 1, has a hemispheric cross-section, and is urged against an electric conductor plate to be described hereunder, i.e., first electric conductor plate 24 through a suitable resilient force of the first movable contact 16 itself and the wave washer 20.

A movable contact piece 17 is secured to the clutch member 15 with one end of the movable contact piece 17 being fixed thereto, so as to integrally rotate with the clutch member 15. Then, the movable contact piece 17 and the first movable contact 16 are electrically connected to each other through the clutch member 15 itself.

The movable contact piece 17 is made of a conductive and suitably resilient plate material such as brass, and punchedly formed to provide a rectangular form in a plane shape. Furthermore, the movable contact piece 17 is somewhat warped in the thicknesswise direction. Because of this warp in cooperation with the resiliency of the movable contact piece 17 itself, second movable contact 18 projected on a free end of the movable contact piece 17 is urged against an electric conductor plate to be described hereunder, i.e., second electric conductor plate 25 through a suitable biasing force.

An driven engageable portion 19 is vertically downwardly projected toward the drive gear 12 at an end portion of the clutch member 15 on the side of the opening. The driven engageable portion 19 is engaged with the driving engageable portion 13 only when the drive gear 12 is normally rotated.

On the ceiling surface of the lid member 3, the first electric conductor plate 24 and the second electric conductor plate 25 are provided to form circles concentrically with the center axis of the supporting axle 14. The first and second electric conductor plates are secured to the ceiling surface by a suitable method such as implanting.

The first electric conductor plate 24 provided at the inner side is formed in a circular shape. The first movable contact 16 bulgedly formed on the clutch member 15 is constantly urged to the first electric conductor plate 24 through the resilient force of the first movable contact 16 itself and the wave washer 20 as described above.

The second electric conductor plate 25 provided at the outer side is formed in a generally C-letter shape, and a cut-away portion thereof forms substantially a non-conductive portion 26. At the central portion of the non-conductive portion 26, a stop position member 27 is formed to provide a generally segmental shape by an electric conductor plate material and disposed in a concentrical circle.

By the resilient force of the second movable contact member 17, the second movable contact 18 projected from the clutch member 15 is constantly urged to circular loci drawn by the second electric conductor plate 25, the non-conductive portion 26 and the stop position member 27.

In an electric circuit consisting of a power source 29, a wiper switch 30, a motor 31 and the like, these first electric conductor plate 24, second electric conductor plate 25 and stop position member 27 are connected as shown in FIG. 5, so as to constitute a switch 28 for turning on and off the electric circuit of the motor 31.

Figure 3:
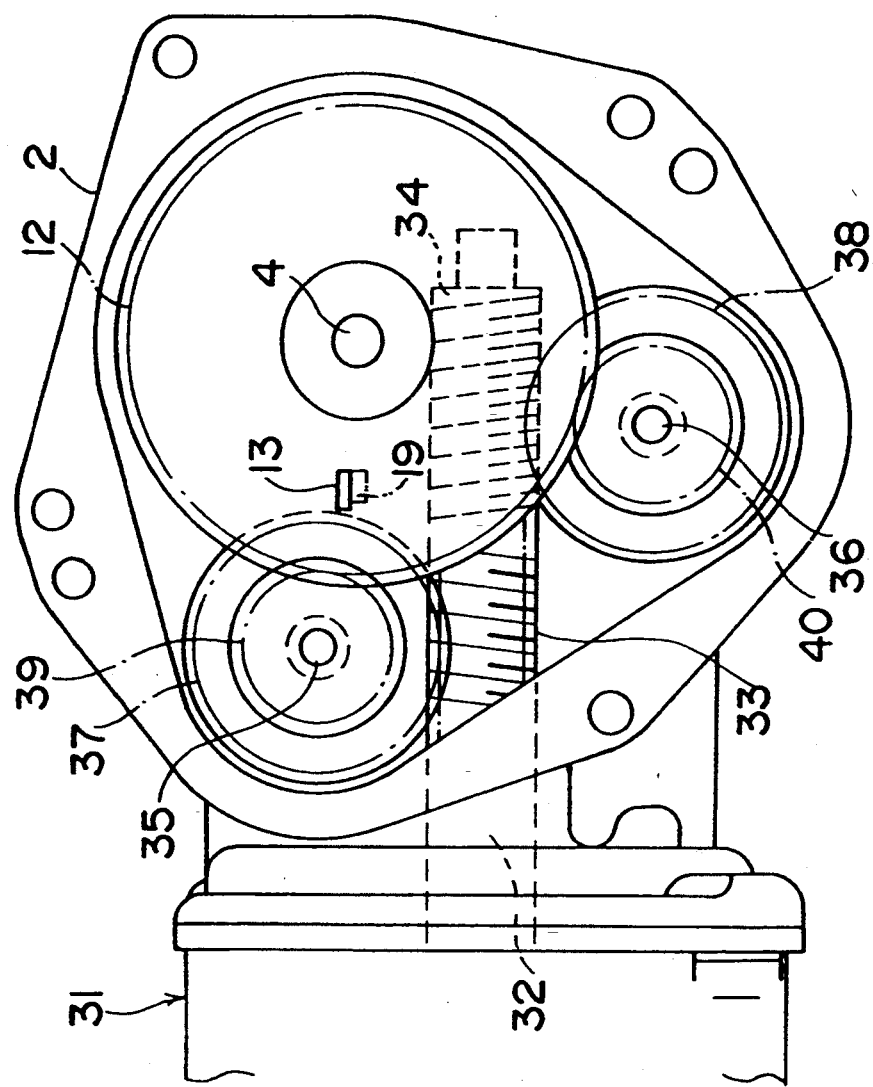
FIG. 3 is a plan view taken along the line III—III in FIG. 1 showing a state, in which the housing is opened.

As shown in FIG. 3, the motor 31 is provided on one side of the housing 1 in connection therewith. A rotary shaft 32 of the motor 31 is inserted into the housing 1 through the main body 2 in a direction perpendicular to the axis of the driveshaft 4.

A pair of worms (hereinafter may be referred to a "right torsion worm" and a "left torsion worm") 33 and 34 with torsions opposite to each other are formed on the outer periphery of the inserted portion of the rotary shaft 32 integrally therewith. A pair of supporting shafts 35 and 36 are projected in parallel to the driveshaft 4 and located at positions opposed to the worms 33 and 34 respectively, and then at opposite sides of the rotary shaft 32 with each other.

Worm wheels 37 and 38 are coupled onto and rotatably supported on the supporting shafts 35 and 36 respectively, and are meshed with the worms 33 and 34 respectively. Intermediate gears 39 and 40 are center-aligned with the worm wheels 37 and 38 respectively being contiguously and integrally provided thereto. Both of the intermediate gears 39 and 40 are meshed with the drive gear 12.

Figure 4:
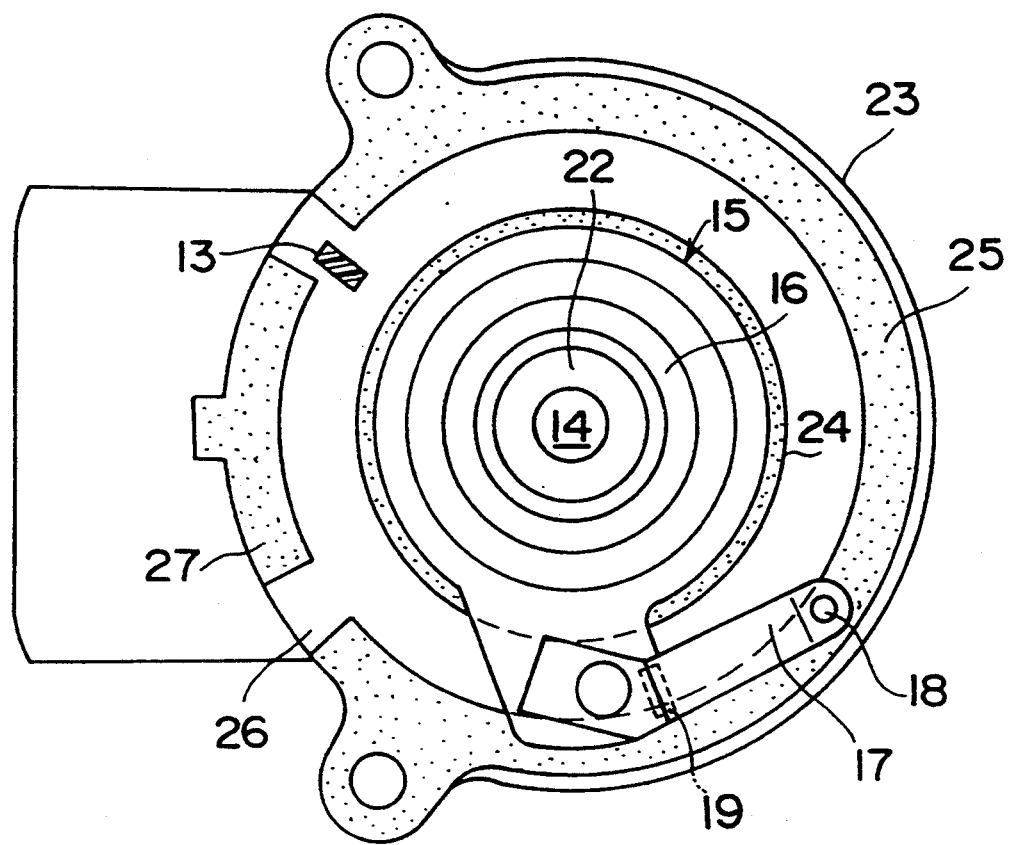
FIG. 4 is a plan view taken along the line IV—IV in FIG. 1.

Action will hereunder be described with reference to FIGS. 4 and 5.

(1) Wiping Operation:

When the wiper switch 30 is turned on, current is passed from the power source 29 through an ON contact of the wiper switch 30 to the ground, whereby the motor 31 is rotated.

The rotation of the motor 31 is transmitted (see FIGS. 1 and 3) to the drive gear 12 through both of the worms 33 and 34 of the rotary shaft 32, both of the worm wheels 37 and 38, and the intermediate gears 39 and 40.

When the drive gear 12 is rotated, the rotational motion is converted into a reciprocating motion of the wiper arm 10 through the link 5 of the driveshaft 4, the rod 7, the linkage 8 and the shaft 9. The reciprocating motion of the wiper arm 10 enables the wiper blade 11 to conduct its wiping operation.

During this wiping operation, the driving engageable portion 13 is engaged with the driven engageable portion 19, to rotate the clutch member 15 together with the drive gear 12. The first movable contact 16 and the second movable contact 18, both of which are formed on the clutch member 15 to rotate integrally, are slidably moved along the first electric conductor plate 24 and the second electric conductor plate 25 respectively.

However, power supply to the motor 31 is performed by bypassing the switch 28, so that the relative sliding motion between these movable contacts 16, 18 and the electric conductor plates 24, 25 does not affect the rotation of the motor 31.

(2) Normal Operation of Home Position Stop:

When the wiper switch 30 is turned off, ON contact in the wiper switch 30 is opened and OFF contact is closed.

In case that the wiper switch 30 is turned off at random when the wiper blade is still not returned to its home position, the first and second movable contacts 16 and 18 remain in contact with the first and second electric conductor plates 24 and 25 as indicated by hypothetical lines in FIG. 5 for example. Namely, current is passed through the power source 29, motor 31, OFF contact of the wiper switch 30, first electric conductor plate 24, first movable contact 16, clutch member 15, movable contact piece 17, second movable contact 18, second electric conductor plate 25 and ground, so that the motor 31 continues to rotate.

In accordance with further rotation of the motor 31, when the second movable contact 18 reaches the non-conductive portion 26 of the second electric conductor plate 25, conduction between the second movable contact 18 and the second electric conductor plate 25 is cut off, so that current is not passed to the motor 31.

Through the inertia in the rotary system including the motor 31, drive gear 12 and the like, the second movable contact 18 is moved to the stop position member 27 and comes into contact therewith, and a closed circuit is formed through the second movable contact 18, stop position member 27, motor 31, OFF contact of the wiper switch 30, first electric conductor plate 24, first movable contact 16, clutch member 15, movable contact piece 17 and second movable contact 18, so that electric braking is effected to immediately stop the rotation of the motor 31.

An interrelation of respective component parts is preset so that the wiper blade 11 comes to an home position at the bottom corner of the window when the motor 31 is immediately stopped as described above. Namely, even if the wiper switch 30 is turned off at random, the wiper blade 11 can be always returned to its home position.

(3) Stopping Operation in Abnormalities:

As shown in FIG. 5, for example, when a pushing-back force acts on the wiper blade 11 due to the accumulation of snow 41 at the lower side of the window, an external force F indicated by a broken-line arrow acts on the wiper arm 10, rod 7 and the like. It results that a turning force P in a direction reverse to the normal rotating direction R indicated by a solid-line arrow acts on the driveshaft 4 through the link 5.

If the second electric conductor plate 25 or the second movable contact 18 is arranged to constantly rotate together with the drive gear 12 as in the conventional example, the second movable contact 18, which has been relatively moved to the non-conductive portion 26 due to the normal rotation of the drive gear 12, is relatively returned to the prior position and comes into recontact with the second electric conductor plate 25 because the drive gear 12 is rotated in the reverse direction by a reversely turning force P.

Current is passed to the motor 31 again by this contact, the motor 31 is also rotated again. And then, the drive gear 12 is rotated in the normal direction R, so that the second movable contact 18 is moved to the non-conductive portion 26 again. When the second movable contact 18 is moved to the non-conductive portion 26 again, the reversely turning force P is applied to the driveshaft 4 again, whereby the second movable contact 18 is pushed back by the second electric conductor plate 25.

After that, the above operation is repeated to produce the chattering phenomenon in which the second movable contact 18 and the second electric conductor plate 25 are connected and disconnected repeatedly.

In this embodiment, however, the clutch member 15 is interposed between the drive gear 12 and the second movable contact 18, so that the above-described chattering phenomenon can be prevented from occurring.

That is, as shown in FIG. 5, when the wiper blade 11 is moved to the lower side of the window to receive the pushing-back force by the snow 41, and the second movable contact 18 moves on the second electric conductor plate 25 to reach the non-conductive portion 26, the second movable contact 18 and the second electric conductor plate 25 are electrically opened, so that current is not passed to the motor 31.

At this time, if the reversely turning force P acts on the driveshaft 4, the drive gear 12 is rotated in the reverse direction because the drive gear 12 is integral with the driveshaft 4. However, the driving engageable portion 13 and the driven engageable portion 19 of the present invention are arranged to disengage from each other when the drive gear 12 is rotated in the reverse direction. Therefore, even when the drive gear 12 is rotated in the reverse direction, the clutch member 15 is not rotated in the reverse direction.

Namely, only the drive gear 12 is rotated in the reverse direction and the clutch member 15 remains behind, so that the second movable contact 18 of the movable contact piece 17, which is mounted on the clutch member 15 to be rotatable integrally with the clutch member 15, is held in contact with the non-conductive portion 26. With this arrangement, the motor 31 continues to stop because non-conduction state to the motor 31 is held. It results that the wiper blade 11 continues to stop at the bottom corner of the window.

In this embodiment, the clutch member 15 is formed as the conductive member, not as the insulator, and one 16 of the movable contacts is formed integrally on the clutch member 15, so that the first electric conductor plate 24 can be provided adjacently to and around the supporting axle 14. Accordingly, the housing 1 as well as lid member 3 can be produced in small size. Furthermore, the number of parts can be reduced and the number of man-hours to assemble it can be decreased.

The first movable contact 16 formed on the clutch member 15 itself is arranged to slide on the first electric conductor plate 24, so that, as compared with the conventional apparatus wherein the clutch member 15 is formed of the insulator, the thickness of the lid member 3 of the present invention can be decreased by the thickness of the insulator.

Further, in this embodiment, the lid member 3 is integrally formed with the resin, and the electric conductor plates 24, 25 and 27 are integrally implanted in the lid member 3, so that the thickness of the lid member 3 can be further decreased. The number of parts can be reduced and the number of man-hours can be decreased.

Incidentally, the present invention should not be limited to the above embodiment and, needless to say, the present invention can be variously modified within the scope of the invention.

As has been described hereinabove, according to the present invention, the dimensions of the housing in the diametrical direction and the thicknesswise direction (axial direction) can be reduced, so that a whole size of the wiper driving apparatus can be produced in small size. Further, the number of parts and the number of man-hours can be decreased, thereby enabling to decrease manufacturing costs.

What is claimed is:

1. A wiper driving apparatus comprising:
   a drive gear rotated by a motor to drive a wiper;
   a clutch member engageable with said drive gear;
   a housing formed of insulating material, said housing comprising a main body having an opening and a lid member covering said opening to define a chamber;
   an axle projecting from said lid member into said chamber and rotatably supporting said clutch member;
   a pair of electric conductor plates constituting part of a switch mechanism for turning on and off an electric circuit of said motor, said electric conductor plates being provided concentrically about said axle; and
   a pair of movable contacts rotatable relative to said electric conductor plates respectively, said movable contacts being arranged on said clutch member for rotation together with said clutch member; wherein
   said lid member and said axle are integrally formed of an electrically insulating resin;
   said electric conductor plates are integrally implanted in said lid member;
   one of said electric conductor plates is of circular shape, is located adjacent and around said axle, and is spaced radially inwardly from the bounds of the other of said electric conductor plates;
   said clutch member is formed of a conductive material and is integrally formed to include a major portion of short cylindrical shape having one end closed by an end wall with a central opening;
   said axle is inserted through said central opening of said end wall; and
   one of said movable contacts is formed integrally on said one closed end of said major portion of said clutch member so as to extend axially from said end wall and along a line of substantial length in a plane perpendicular to said axle and is in sliding contact along said line with said one electric conductor plate located adjacent to and around said axle.

2. The wiper driving apparatus as set forth in claim 1, wherein said one of the movable contacts is bulgedly formed on the outer peripheral portion of said closed end of said clutch member.

3. The wiper driving apparatus as set forth in claim 2, wherein said one of the movable contacts is formed to provide a hemisphere pan shape in cross-section.

4. The wiper driving apparatus as set forth in claim 3, wherein said one of the movable contacts is constantly urged against said electric conductor plate on the inner peripheral side through resiliencies of said movable contact itself and a wave washer.

5. The wiper driving apparatus as set forth in claim 1, wherein the other of said movable contacts is electrically conductively secured to said clutch member through a movable contact piece and is urged against said electric conductor plate on the outer peripheral side through the resiliency of said movable contact piece.

6. The wiper driving apparatus as set forth in claim 1 wherein said line of substantial length along which said one movable contact extends is one extending arcuately of said central opening.

7. The wiper driving apparatus as set forth in claim 1 wherein said one movable contact is bulged axially outwardly from said end wall and is of an annular shape concentric with said central opening of said end wall.

* * * * *